(No Model.)
J. B. LAMB.
GRAIN GATHERING AND BINDING IMPLEMENT.
No. 246,890. Patented Sept. 13, 1881.
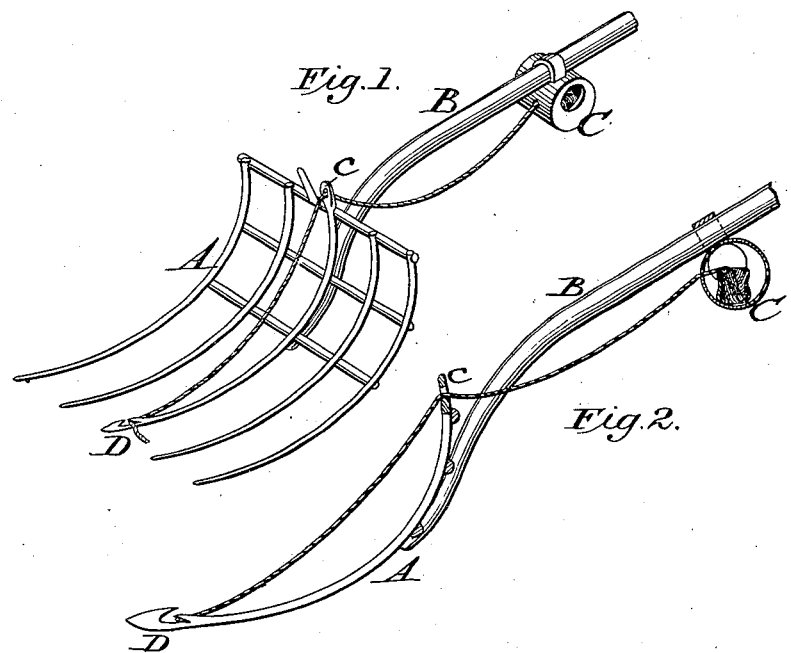
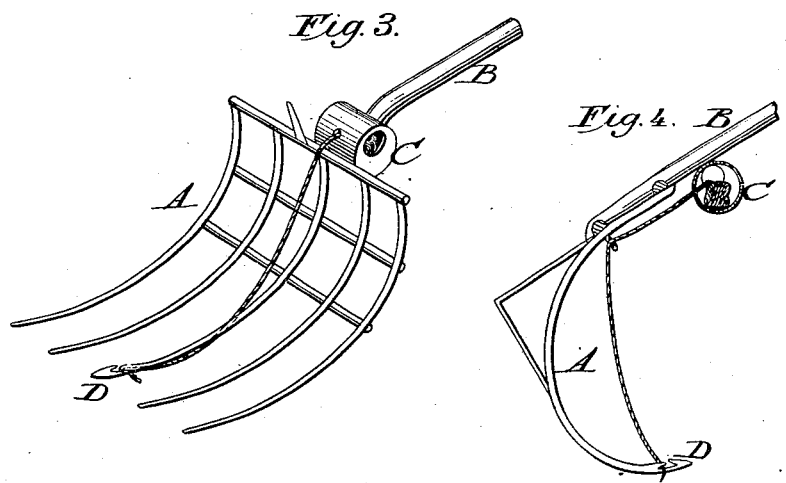
Attest.
Sidney P. Hollingsworth.
Robt. L. Miller.
Inventor.
J. B. Lamb.
By his atty
Philip T. Dodge.

UNITED STATES PATENT OFFICE.

JAMES B. LAMB, OF OTTAWA, CANADA.

GRAIN GATHERING AND BINDING IMPLEMENT.

SPECIFICATION forming part of Letters Patent No. 246,890, dated September 13, 1881.

Application filed July 5, 1881. (No model.)

*To all whom it may concern:*

Be it known that I, JAMES B. LAMB, of Ottawa, in the county of Carleton, Canada, have invented certain Improvements in Grain Gathering and Binding Implements, of which the following is a specification.

My invention relates to an implement intended to facilitate the gathering and binding of grain by hand on the harvest-field; and it consists, essentially, in a fork, rake, or similar grain gathering and retaining implement, provided with a cord-carrying device, and a device for holding and leading the cord in an extended position beneath the grain; also, in providing the same, when desired, with a knife or blade for severing the cord.

In making use of my implement the cord extends from the holder or carrying device to the fastening device in such position as to lie beneath the grain when the latter is received upon the implement. The grain being gathered by the implement in sufficient quantity to form a sheaf or bundle, the operator detaches the end of the cord from the holding device, passes it by hand around the bundle, and fastens it thereto. He then releases the bundle by severing the cord upon the knife or blade, after which the bundle is discharged and the cord again extended to the retaining or fastening device.

The form of my implement and the details of construction may be varied to any extent desired, provided it retains the essential characteristics above named.

Referring to the accompanying drawings, Figure 1 represents a perspective view of my implement in the form of a fork. Fig. 2 is a vertical longitudinal section through the center of the same. Fig. 3 is a perspective view of the implement in a slightly-modified form. Fig. 4 is a vertical longitudinal section, showing the implement in the form of a rake. Fig. 5 is an enlarged view, illustrating the form of the cord-retaining device.

A represents the body of the instrument, consisting of a series of parallel teeth or tines, constructed in any suitable form, to receive and retain the gavel attached to a handle, B, by means of which the implement is operated to gather the grain thereon.

The teeth may be of the form shown in Figs. 1 and 4, or of any other suitable form.

C represents a box or case to receive a spool or ball of binding-cord, secured to the handle of the implement at any suitable point. This box is ordinarily constructed with an opening in one or both ends above the bottom to admit of a ball of twine being passed therein, and at the same time to prevent its escape. An opening made in the side or end of the box permits the cord to be extended therefrom to the retaining device.

D represents a device for retaining or holding the end of the cord and keeping the same in its extended position preparatory to the reception of the grain thereon. This device, which may be of any suitable form, is preferably a hook-shaped catch formed upon the forward end of the central tooth or finger of the gathering device, as represented in the various figures. By providing the device with a central tooth, $a$, as shown in Fig. 5, the attachment of the cord thereto is greatly facilitated.

When the twine-holding box is located near the gathering-finger, as shown in Fig. 3, the cord may be extended therefrom directly to the retaining device D; but when the box or case is located at a higher point upon the handle, as shown in Figs. 1, 2, and 4, an eye or guide, $c$, should be provided to retain the cord in position.

Having thus described my invention, what I claim is—

1. The portable grain gathering and binding device for hand use, consisting of a series of gathering-fingers provided with a handle and with devices, substantially as shown, for carrying the binding-cord and retaining the same in an extended position as the fingers are passed beneath the grain.

2. The combination of a series of gathering-fingers, a handle, a cord-carrying device, $c$, or its equivalent, located at the inner ends of the fingers, and a cord-holding device, D, located at the outer ends of the fingers, as shown.

3. A hand binding implement consisting of the series of teeth attached to a handle, the cord-carrying device, a cord-retaining device at the forward ends of the teeth, and a knife or blade, substantially as shown.

4. In a binder, the cord-retaining device consisting in the finger provided with the central tooth, $a$.

JAMES BYRNE LAMB.

Witnesses:
L. J. COURSOLLES,
J. COURSOLLE.